United States Patent [19]

Kai et al.

[11] 4,368,843

[45] Jan. 18, 1983

[54] AIR CONDITIONER CONTROL METHOD AND APPARATUS

[75] Inventors: Yasuhito Kai, Kariya; Teiichi Nabeta, Okazaki; Akio Takemi, Kariya, all of Japan

[73] Assignee: Nippondenso Co., Ltd., Kariya, Japan

[21] Appl. No.: 252,002

[22] Filed: Apr. 7, 1981

[30] Foreign Application Priority Data

Apr. 11, 1980 [JP] Japan .................. 55-48194

[51] Int. Cl.³ .................. F24F 7/00; G05D 23/00
[52] U.S. Cl. .................. 236/49; 236/46 F; 165/16; 165/12
[58] Field of Search .................. 62/186, 407, 408, 231, 62/157; 236/49, 46 R, 1 B, 46 F; 98/2.01, 2.11, 2.08, 41 R; 165/12, 16, 42, 43

[56] References Cited

U.S. PATENT DOCUMENTS 1,950,614 3/1934 Krogh .................. 236/46 X
2,259,780 10/1941 Seid .................. 62/186 X

FOREIGN PATENT DOCUMENTS 2330042 3/1974 Fed. Rep. of Germany ........ 236/49
55-126759 9/1980 Japan .................. 62/186

Primary Examiner—William E. Wayner
Assistant Examiner—Harry Tanner
Attorney, Agent, or Firm—Cushman, Darby & Cushman

[57] ABSTRACT

In an air conditioner control method and apparatus, an air flow direction control device is arranged to be adjusted to at least first and second positions in which an air flow is directed respectively to first and second portions in a compartment, and the air flow direction control device is adjusted to its first and second positions in response to each lapse of first and second periods of time which are respectively calculated to maintain the air flow direction toward the first and second portions in the compartment in relation to any deviation between the actual temperature in the compartment and a desired temperature, the air flow direction control device being maintained at the adjusted position during each of the calculated first and second periods of time.

8 Claims, 7 Drawing Figures

4,368,843

AIR CONDITIONER CONTROL METHOD AND APPARATUS

BACKGROUND OF THE INVENTION

The present invention relates to an air conditioner control method and apparatus, and more particularly, but not exclusively, to such a method and apparatus suitable for an automobile air conditioner.

In conventional automobile air conditioners, direction of an air flow is manually adjustable by a passenger to a desired portion in the passenger compartment. It has, however, been experienced that when the passenger is exposed to the air flow at his same portion for a long period of time, the feeling of warmth or cool gradually decreases, occasionally resulting in unpleasant condition to the passenger.

SUMMARY OF THE INVENTION

It is, therefore, a primary object of the present invention to provide an air conditioner control method and apparatus in which an air flow is automatically directed to different portions in a compartment or other region to maintain pleasant feeling of warmth or cool in the compartment or other region.

Another object of the present invention is to provide an air conditioner control method and apparatus in which the air flow direction is automatically adjusted in relation to variation of the actual temperature in the compartment or other region to enhance the feeling of warmth or cool for a long period of time.

In a preferred embodiment of the present invention, the above objects are accomplished by provision of a method of automatically controlling an air conditioner which supplies an air flow into a compartment or other region, the air conditioner comprising air flow temperature control means for adjusting the actual temperature in the compartment or other region to a desired value and maintaining it at the desired value, and air flow direction control means arranged to be adjusted to at least first and second positions in which the air flow is directed respectively to first and second portions in the compartment or other region. The control method comprises the steps of (a) detecting a deviation between the actual temperature in the compartment or other region and the desired value;

(b) calculating first and second periods of time respectively for maintaining the air flow direction toward the first and second portions in the compartment or other region in relation to the detected deviation;

(c) producing a first output signal indicative of the calculated first period of time and successively producing a second output signal indicative of the calculated second period of time upon lapse of the calculated first period of time;

(d) adjusting the air flow direction control means to its first position in response to the first output signal and maintaining it at the adjusted position during the calculated first period of time; and (e) adjusting the air flow direction control means to its second position in response to the second output signal and maintaining it at the adjusted position during the calculated second period of time, the first and second output signals being repetitively produced to adjust the air flow direction control means from its first position to its second position.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
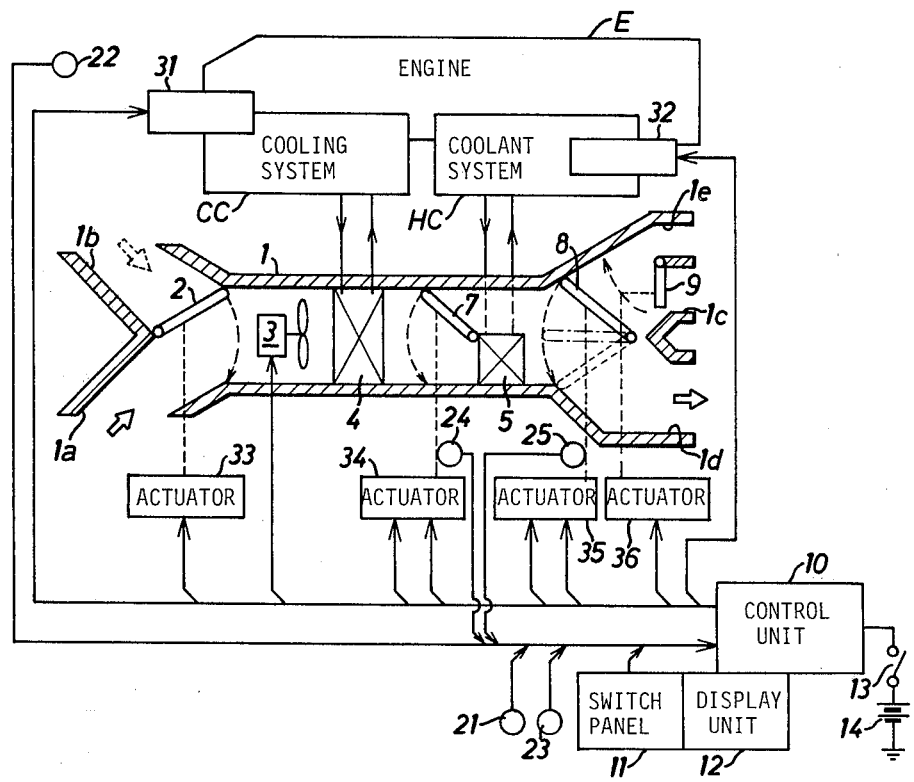
FIG. 1 is a schematic block diagram of an electronic control apparatus in accordance with the present invention adapted to an automobile air conditioner.

Referring now to the drawings, in particular to FIG. 1 there is illustrated a schematic block diagram of an electronic control apparatus in accordance with the present invention adapted to an automobile air conditioner. The air conditioner comprises an air duct 1 which is provided therein with a first switch door 2 cooperable with an actuator 33 in the form of an electrically operated vacuum mechanism having a conventional construction. While the actuator 33 receives therein the atmospheric pressure from the exterior, the first switch door 2 is maintained at an upper position shown in FIG. 1 such that a first inlet 1a of air duct 1 is opened to recirculate the air from the passenger compartment into the air duct 1. When the actuator 33 receives therein vacuum pressure from an intake manifold of an engine E for the automobile, the first switch door 2 is switched over into a lower position such that a second inlet 1b of air duct 1 is opened to induce the air from the exterior into the air duct 1.

The air conditioner also comprises a blower 3 and an evaporator 4 of a cooling system CC respectively provided within the air duct 1. The blower 3 is driven upon receipt of an electric power supply from an electric source 14 through an ignition switch 13 to impel the air from one of inlets 1a, 1b toward the evaporator 4. When the evaporator 4 receives the air from blower 3, refrigerant medium in evaporator 4 is warmed by heat of the air to extract heat from the air. The heat-extracted air is applied from the evaporator 4 to an air-blend door 7 as the cooled air, whereas the warmed refrigerant medium is circulated into a refrigerant compressor of cooling system CC. This compressor is provided at its shaft with an electromagnetic clutch mechanism 31 operatively coupled to an output shaft of engine E. When the clutch mechanism 31 is energized, the compressor of cooling system CC is connected to and driven by the engine E such that the warmed refrigerant medium from evaporator 4 is compressed to discharge heat therefrom to the exterior. The compressed refrigerant medium is applied through a receiver to an expansion valve of cooling system CC and is changed into refrigerant medium with low pressure to be recirculated into the evaporator 4.

A heater 5 is provided within the air duct 1 and connected to a coolant system HC for the engine E. The engine coolant system HC includes a solenoid valve 32 which is selectively energized to permit the flow of hot water from the coolant system HC to the heater 5. The heater 5 receives the hot water from solenoid valve 32 to warm the cooled air from the evaporator 4 in a substantially constant temperature value. The warmed air from the heater 5 is mixed with the cooled air from evaporator 4 and applied to a second switch door 8 as the mixed air. The air-blend door 7 is provided within the air duct 1 and coupled to an actuator 34 in the form of an electrically operated vacuum mechanism having a conventional construction. The actuator 34 selectively receives vacuum pressure and the atmospheric pressure respectively from the engine intake manifold and the exterior to adjust the actual opening angle Ar of air-blend door 7 into an optimum value. This means that the proportion of the warmed and cooled air is controlled in dependence upon the actual door opening angle Ar.

The second switch door 8 is provided within the air duct 1 and coupled to an actuator 35 in the form of an electrically operated vacuum mechanism having a conventional construction. When the actuator 35 normally receives the atmospheric pressure from the exterior, it maintains the second switch door 8 in an upper or original position shown by a solid line in FIG. 1 such that a lower outlet 1d of air duct 1 is opened to discharge all the mixed air toward a lower portion of the passenger compartment therethrough. When the actuator 35 receives vacuum pressure from the engine intake manifold, it switches over the second switch door 8 into a middle position shown by a dot-and-solid line in FIG. 1 such that the mixed air partly flows toward a third switch door 9 and the remainder of the mixed air is discharged through the lower outlet 1d toward the lower portion of the passenger compartment. When the actuator 35 further receives vacuum pressure from the engine intake manifold, it switches over the second switch door 8 into a lower position shown by a dotted line in FIG. 1 such that all the mixed air flows toward the third switch door 9.

The third switch door 9 is provided within the air duct 1 and coupled to an actuator 36 in the form of an electrically operated vacuum mechanism having a conventional construction. While the actuator 36 normally receives the atmospheric pressure from the exterior, it maintaines the third switch door 9 in a lower or original position shown by a solid line in FIG. 1 such that an upper outlet 1e is opened to discharge the mixed air from second switch door 8 toward an upper portion of the passenger compartment. When the actuator 36 receives vacuum pressure from the engine intake manifold, the third switch door 9 is switched over into an upper position such that a middle outlet 1c of air duct 1 is opened to discharge the mixed air from second switch door 8 toward a middle portion of the passenger compartment.

In operation of the second switch door 8 relative to that of the third switch door 9, all the mixed air is discharged through the lower outlet 1d when the second switch door 8 is maintained at the upper position and the third switch door 9 is maintained at the lower position. This means that the switch doors 8 and 9 are conditioned in HEAT-mode control. When the second switch door 8 is located at the middle position and the third switch door 9 is located at the upper position, the mixed air is partly discharged through the middle outlet 1c toward the middle portion of the passenger compartment, and the remainder of the mixed air is discharged through the lower outlet 1d toward the lower portion of the passenger compartment. This means that the switch doors 8 and 9 are conditioned in BI-LEVEL mode control.

When the second switch door 8 is located at the lower position and the third switch door 9 is located at the upper position, all the mixed air is discharged through the middle outlet 1c toward the middle portion of the passenger compartment. This means that the switch doors 8 and 9 are conditioned in ventilation mode control (hereinafter represented as VENT-mode control). When each of the second and third switch doors 8 and 9 is located at the lower position, all the mixed air is discharged through the upper outlet 1e toward the upper portion of the passenger compartment. This means that the switch doors 8 and 9 are conditioned in defrosting mode control (hereinafter represented as DEF-mode control).

Figure 2:
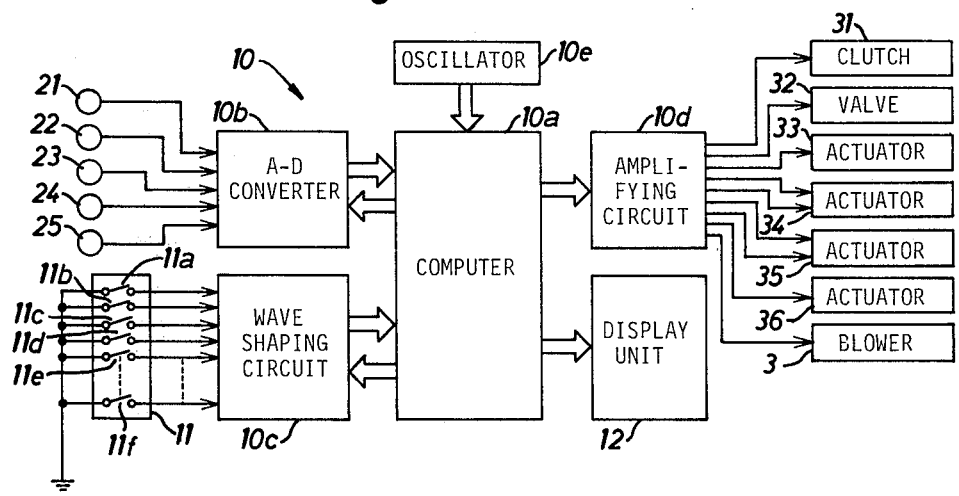
FIG. 2 is a circuit diagram of the electronic control apparatus shown in FIG. 1.

The electronic control apparatus comprises an electronic control unit 10, a switch panel 11 and a display unit 12. The switch panel 11 is mounted within the passenger compartment and provided therein with a plurality of manually operable selector switches each of which is grounded at its one end and connected at its other end to the control unit 10 (see FIGS. 1 and 2). The selector switch 11a is used as a main switch which is closed to produce a command signal for operating the air conditioner, and the selector switch 11b is used as an automatic control switch which is closed to produce a command signal for automatic control of the air conditioner. The selector switch 11c is used as a DEF-mode switch which is closed to produce a command signal for the DEF-mode control. The selector switch 11d is used as a VENT-mode switch which is closed to produce a command signal for the VENT-mode control, and the selector switch 11e is used as a HEAT-mode switch which is closed to produce a command signal for the HEAT-mode control. The selector switch 11f is also used as a BI-LEVEL mode switch which is closed to produce a command signal for the BI-LEVEL mode control. In the embodiment, one of the selector switches 11b, 11c, 11d and 11e is released upon closure of one of the other selector switches. Additionally, the selector switches except the switches 11a to 11f are used to produce command signals respectively for control of various electric elements for the air conditioner.

The electronic control unit 10 is provided with an analog-to-digital or A-D converter 10b connected to various sensors 21, 22, 24 and 25 and a temperature selector 23 and with a wave shaping circuit 10c connected to the switch panel 11. The in-car sensor 21 is in the form of a thermistor provided within the passenger compartment. The sensor 21 serves to detect the actual temperature Tr of air in the passenger compartment so as to produce an analog signal with a level corresponding to the actual in-car temperature Tr. The outside ambient sensor 22 is also in the form of a thermistor located adjacent a grill for a radiator of the automobile. The ambient sensor 22 detects the actual ambient temperature Ta of air outside the automobile to produce an analog signal with a level corresponding to the actual ambient temperature Ta. The temperature selector 23 is assembled on an instrument panel in the passenger compartment such that it is manipulated to select a desired temperature Ts of air in the passenger compartment and to produce an analog signal with a level corresponding to the desired or selected temperature Ts.

The door position sensor 24 is in the form of a potentiometer which is coupled to the air-blend door 7. The sensor 24 detects the actual opening angle Ar of air-blend door 7 to produce an analog signal with a level corresponding to the actual door opening angle Ar. The door position sensor 25 is also in the form of a potentiometer which is coupled to the second switch door 8. The sensor 25 detects the actual opening position Ao of second switch door 8 to produce an analog signal with a level corresponding to the actual door opening position Ao. All the analog signals from the sensors 21, 22, 24 and 25 and the temperature selector 23 are sequentially converted by the A-D converter 10b into binary signals respectively indicative of the actual in-car and outside temperatures Tr and Ta, the actual door opening angle Ar, the actual door opening position Ao and the selected temperature Ts each of which is applied to a digital computer 10a. The wave shaping circuit 10c includes a plurality of wave shapers connected respectively to the selector switches of switch panel 11. All the command signals from the selector switches of switch panel 11 are respectively reshaped by the wave shapers of wave shaping circuit 10c and applied to the digital computer 10a.

The digital computer 10a is in the form of a single chip LSI microcomputer which receives a constant voltage from a voltage stabilizer (not shown) to be ready for its operation. The voltage stabilizer is supplied with electric power from the electric source 14 upon actuation of ignition switch 13 to produce the constant voltage. The microcomputer 10a comprises a central processing unit or CPU, an input-output device or I/O, a read only memory or ROM, and a random access memory or RAM which are connected through a bus line to each other. I/O receives the binary and reshaped command signals respectively from A-D converter 10b and wave shaping circuit 10c upon request of CPU to store them in RAM temporarily. These stored signals are selectively read out from RAM and applied to CPU through the bus line. The microcomputer 10a comprises a clock circuit which is connected through the bus line to CPU. The clock circuit of microcomputer 10a is cooperable with a crystal oscillator 10e to produce a series of clock signals in accordance with which CPU serves to execute a predetermined program. A timer in the form of a counter is provided within the microcomputer 10a and cooperable with RAM to provide a timer data D in accordance with clock signals from the clock circuit. In the embodiment, the timer data D has a value corresponding with a lapse time defined by integer times of a time period at which the microcomputer 10a executes the predetermined program.

The above-noted predetermined program is previously stored in ROM and includes a switchover control program for switching over the second and third switch doors 8 and 9 respectively under control of the actuators 35 and 36. The switchover control program is arranged to be executed in the microcomputer 10a as in the followings.

(1) When the automatic control switch 11b is opened, CPU serves to generate output signals necessary for conditioning the second and third switch doors 8 and 9 in the DEF, VENT and HEAT mode control respectively under closures of DEF, VENT and HEAT mode switches 11c, 11d and 11e. CPU also generates output signals necessary for conditioning the switch doors 8 and 9 in the BI-LEVEL mode control when each of switches 11b, 11c, 11d and 11e is opened.

(2) When the control switch 11b is closed, CPU calculates a deviation $\Delta T$ between the selected and actual in-car temperature Ts and Tr read out from RAM and discriminates whether or not the calculated deviation $\Delta T$ is maintained in a temperature range from $-5°$ C. to $5°$ C. When the calculated deviation $\Delta T$ is smaller than or equal to $-5°$ C., CPU generates output signals necessary for conditioning the switch doors 8 and 9 in the VENT-mode control. When the calculated deviation $\Delta T$ is larger than or equal to $5°$ C., CPU generates an output signal necessary for conditioning the second switch door 8 in the HEAT-mode control with the third switch door 9 located at the lower position. When the calculated deviation $\Delta T$ is maintained in the temperature range from $-5°$ C. to $5°$ C., CPU generates output signals necessary for conditioning the switch doors 8 and 9 in periodic switchover control.

Figure 7:
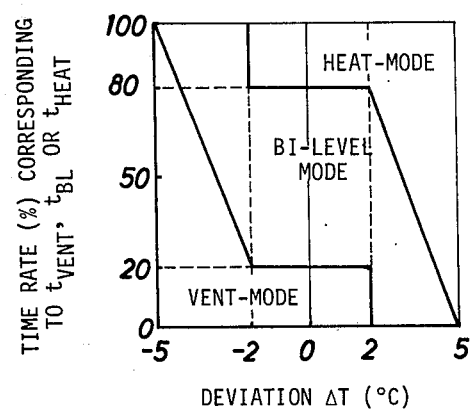
FIG. 7 is a graph indicative of switchover mode property in relation to a temperature deviation.

(3) When the calculated deviation $\Delta T$ is larger than $-5°$ C. and smaller than $-2°$ C., CPU obtains a pair of time rates relative to the calculated deviation $\Delta T$ under reset of a first flag indicative of switchover control between the VENT and BI-LEVEL modes on a basis of a switchover mode property representing relationship between the calculated deviation $\Delta T$ and the time rate. The switchover mode property is experimentally obtained as shown in FIG. 7 to be previously stored in ROM. Then, CPU multiplies the obtained time rates by a predetermined time duration to provide VENT and BI-LEVEL mode times $t_{VENT}$ and $t_{BL}$ respectively for maintaining the VENT and BI-LEVEL mode control. The predetermined time duration is experimentally determined in consideration with performance of the air conditioner to be previously stored in ROM.

After providing the mode times $t_{VENT}$ and $t_{BL}$, CPU serves to set a first flag and to reset the timer of microcomputer 10a in such a way that the number of one is added to a value of the preceding timer data D to make the following timer data D. Then, CPU generates output signals necessary for conditioning the switch doors 8 and 9 in the BI-LEVEL mode control until the value of the following timer data D increases up to one corresponding with the BI-LEVEL mode time $t_{BL}$. This means that generation of the output signals from CPU is repetitively continued until lapse of the BI-LEVEL mode time $t_{BL}$. CPU also generates output signals necessary for conditioning the switch doors 8 and 9 in the VENT-mode control until the value of the following timer data D increases up to one corrsponding with a total of the BI-LEVEL and VENT mode times $t_{BL}$ and $t_{VENT}$ after lapse of the mode time $t_{BL}$. This means that generation of the output signals from CPU is repetitively continued until lapse of the total mode time $(t_{BL} + t_{VENT})$ after lapse of the mode time $t_{BL}$. In addition, the first flag is reset upon lapse of the total mode time $(t_{BL} + t_{VENT})$.

(4) When the calculated deviation $\Delta T$ is maintained in a temperature range of $-2°$ C. or more and $2°$ C. or less, CPU obtains three time rates relative to the calculated deviation $\Delta T$ on a basis of the switchover mode property under reset of a second flag indicative of switchover control between the VENT, BI-LEVEL and HEAT modes. Then, CPU multiplies the obtained time rates by the predetermined time duration from ROM to provide VENT and BI-LEVEL mode times $t_{VENT}$, $t_{BL}$ and to provide a HEAT-mode time $t_{HEAT}$ for maintaining the HEAT-mode control.

After providing the mode times $t_{VENT}$, $t_{BL}$ and $t_{HEAT}$, CPU serves to set a second flag and to reset the timer of microcomputer 10a in such a way that the preceding timer data D is updated as the following one, as previously described. Then, CPU generates output signals necessary for conditioning the switch doors 8 and 9 in the VENT-mode control until lapse of the VENT-mode time $t_{VENT}$. After lapse of the mode time $t_{VENT}$, CPU generates output signals necessary for conditioning the switch doors 8 and 9 in the BI-LEVEL mode control until lapse of a total of the VENT and BI-LEVEL mode times $t_{VENT}$ and $t_{BL}$. After lapse of the total mode time ($t_{VENT}+t_{BL}$), CPU generates an output signal necessary for conditioning the second switch door 8 in the HEAT-mode control with the third switch door 9 located at the lower position until lapse of a total of the mode times $t_{VENT}$, $t_{BL}$ and $t_{HEAT}$. In addition, the second flag is reset upon lapse of the total mode time ($t_{VENT}+t_{BL}+t_{HEAT}$).

(5) When the calculated deviation $\Delta T$ is maintained larger than 2° C. and smaller than 5° C., CPU obtains a pair of time rates relative to the calculated deviation $\Delta T$ on a basis of the switchover mode property under reset of a third flag indicative of switchover control between the BI-LEVEL and HEAT modes. Then, CPU multiplies the obtained time rates by the predetermined time duration to provide BI-LEVEL and HEAT mode times $t_{BL}$ and $t_{HEAT}$.

After providing the mode times $t_{BL}$ and $t_{HEAT}$, CPU serves to set a third flag and to reset the timer of microcomputer 10a in such a way that the preceding timer data D is updated as the following one, as previously described. Then, CPU generates output signals necessary for conditioning the switch doors 8 and 9 in the BI-LEVEL mode control until lapse of the BI-LEVEL mode time $t_{BL}$ and also generates an output signal necessary for conditioning the second switch door 8 in the HEAT-mode control with the third switch door 9 located at the lower position until lapse of a total of the mode times $t_{BL}$ and $t_{HEAT}$ after lapse of the mode time $t_{BL}$. In addition, the third flag is reset upon lapse of the total mode time ($t_{BL}+t_{HEAT}$). The above-noted predetermined program also includes a conventional control program for controlling the blower 3, clutch mechanism 31 and solenoid valve 32 and for controlling the first switch door 2 and air-blend door 7 respectively under control of the actuators 33 and 34. The conventional control program is arranged to be executed in the microcomputer 10a in such a conventional manner.

The electric control unit 10 is also provided with an amplifying circuit 10d which is formed by a plurality of amplifiers respectively connected to the blower 3, clutch mechanism 31, solenoid valve 32 and actuators 33 to 36. The above-noted output signals from microcomputer 10a are amplified and latched by a pair of the amplifiers of amplifying circuit 10d and then applied to the actuators 35 and 36. The display unit 12 is provided to indicate various operational modes of the switch doors 8 and 9 upon receipt of the above-noted output signals from microcomputer 10a. Additionally, when output signals necessary for controlling the blower 3, clutch mechanism 31, solenoid valve 32 and actuators 33, 34 are generated by the microcomputer 10a in accordance with the conventional control program, they are amplified and latched by the remaining amplifiers of amplifying circuit 10d and then applied to the blower 3, clutch mechanism 31, solenoid valve 32 and actuators 33, 34.

Operation of the above embodiment will be described below in detail with reference to flow diagrams shown respectively in FIGS. 3 to 6. When the ignition switch 13 is actuated, the voltage stabilizer receives the electric power supply from electric source 14 to produce a constant voltage upon receipt of which the microcomputer 10a is conditioned in its operation such that it is initialized to execute the above-noted predetermined program at a time period of hundreds of milliseconds. In addition, first, second and third flags are respectively reset at the initialization of microcomputer 10a.

Figure 3:
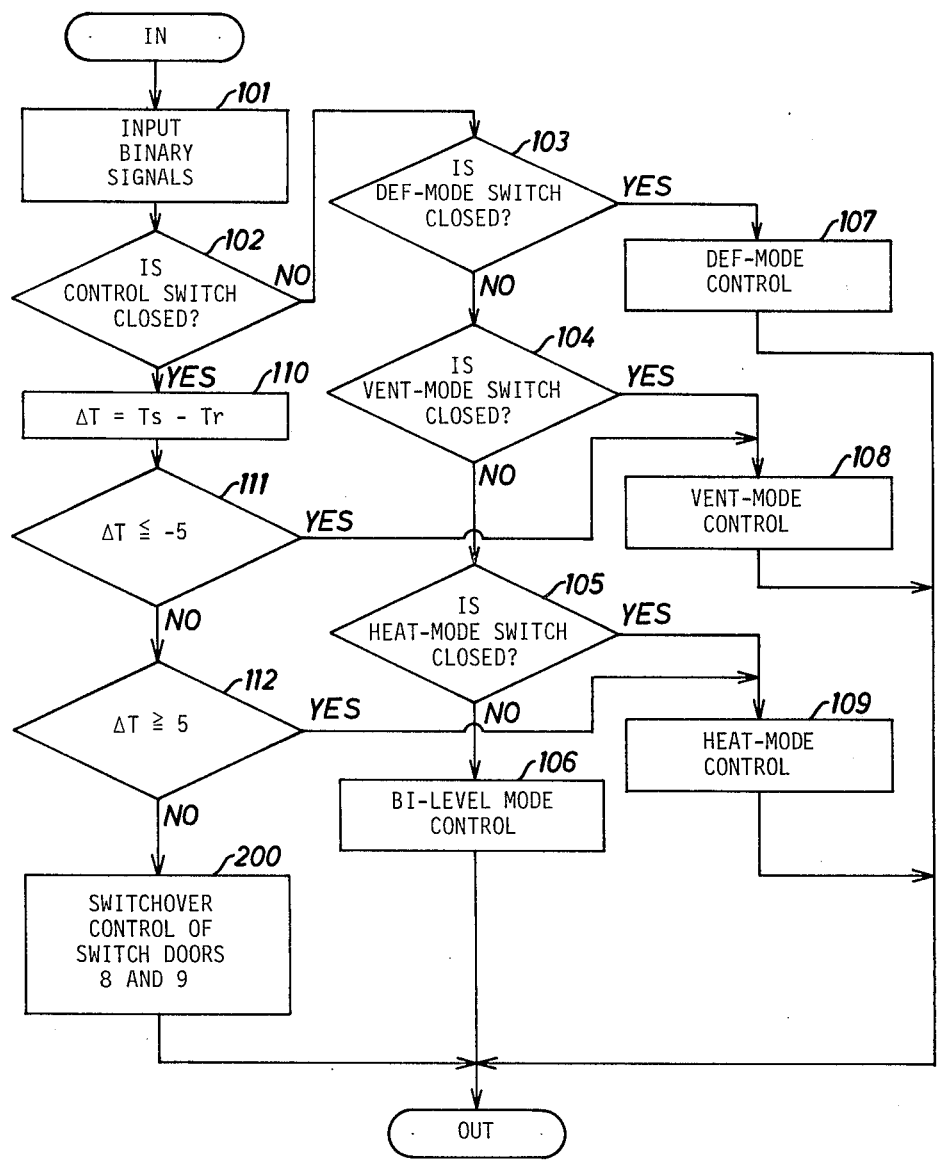
FIG. 3 is the whole flow diagram illustrating operation of the digital computer shown in block form in FIG. 2.

Assuming that execution of the conventional control program is completed to control various electric elements of the air conditioner with the second and third switch doors 8 and 9 located respectively at their original positions, the conventional control program proceeds to a point 101 of the switchover control program shown by the flow diagram of FIG. 3. When an analog signal with a level corresponding to the actual in-car temperature Tr is produced from the in-car sensor 21, it is converted by the A-D converter 10b into a binary signal indicative of the actual in-car temperature Tr. When an analog signal with a level corresponding to a desired temperature Ts is produced from the temperature selector 23, it is converted by the A-D converter 10b into a binary signal indicative of the desired temperature Ts. When an analog signal with a level corresponding to the actual opening angle Ar of air-blend door 7 is produced from the position sensor 24, it is converted by the A-D converter 10b into a binary signal indicative of the actual door opening angle Ar. When an analog signal with a level corresponding to the original opening position Ao defined by the original position of switch door 8 is produced from the position sensor 25, it is also converted by the A-D converter 10b into a binary signal indicative of the original door opening position Ao. All the binary signals from A-D converter 10b are applied to and stored in RAM temporarily. When various command signals are produced from the switch panel 11 in relaion to actuation of the selector switches 11a to 11f, they are reshaped by the wave shaping circuit 10c and applied to RAM to be temporarily stored in RAM.

When the switchover control program proceeds to the following point 102, CPU discriminates as to whether or not the selector or automatic control switch 11b is closed under closure of the selector or main switch 11a. If the control switch 11b is closed, CPU discriminates as "yes" on a basis of the command signal from RAM to proceed the switchover control program to a point 110. If the control switch 11b is opened, CPU discriminates as "no" to proceed the switchover control program to a point 103. At this point 103, if the selector or DEF-mode switch 11c is opened, CPU discriminates as "no" to proceed the switchover control program to a point 104. If the DEF-mode switch 11c is closed, CPU discriminates as "yes" on a basis of the command signal from RAM to proceed the switchover control program to a point 107. Then, an output signal is produced from CPU in relation to the original door opening position Ao and is applied to the display unit 12 and the amplifying circuit 10d. Thus, the display unit 12 is responsive to the output signal from CPU to display the DEF-mode control of the switch doors 8 and 9, whereas the amplifying circuit 10d amplifies and latches the output signal from CPU such that the actuator 35 receives vacuum pressure from the engine intake manifold to switch over the second switch door 8 into the lower position under the lower position of third switch door 9. As a result, the mixed air through air duct 1 is discharged through the upper outlet 1e toward the upper portion of the passenger compartment.

If the VENT-mode switch 11d is opened at point 104, CPU discriminates as "no" to proceed the switchover control program to a point 105. If the VENT-mode switch 11d is closed at point 104, CPU discriminates as "yes" to proceed the switchover control program to a point 108. Then, an output signal is produced from CPU in relation to the original door opening position Ao, and another output signal is also produced from CPU. These output signals are subsequently applied to the display unit 12 and the amplifying circuit 10d. Thus, the display unit 12 is responsive to the output signals from CPU to display the VENT-mode control of the switch doors 8 and 9, whereas the amplifying circuit 10d amplifies and latches the output signals in response to which the actuators 35 and 36 receive vacuum pressure from the engine intake manifold respectively to switch over the switch doors 8 and 9 into the lower and upper positions. As a result, the mixed air through air duct 1 is discharged through the middle outlet 1c toward the middle portion of the passenger compartment.

If the HEAT-mode switch 11e is opened at point 105, CPU discriminates as "no" to proceed the switchover control program to a point 106. Then, an output signal is produced from CPU in relation to the original door opening position Ao, and another output signal is also produced from CPU. These output signals are subsequently applied to the display unit 12 and the amplifying circuit 10d. Thus, the display unit 12 is responsive to the output signals from CPU to display the BI-LEVEL mode control of the switch doors 8 and 9, whereas the amplifying circuit 10d amplifies and latches the output signals in response to which the actuators 35 and 36 receive vacuum pressure from the engine intake manifold in response to which the switch doors 8 and 9 are switched over respectively into the middle and upper positions. As a result, the mixed air is partly discharged through the middle outlet 1c toward the middle portion of the passenger compartment, and the remaining mixed air is discharged through the lower outlet 1d toward the lower portion of the passenger compartment.

If the HEAT-mode switch 11e is closed at point 105, CPU discriminates as "yes" to proceed the switchover control program to a point 109. Then, an output signal is produced in relation to the original door opening position Ao and applied to the display unit 12 and the amplifying circuit 10d. Thus, the display unit 12 is responsive to the output signal from CPU to display the HEAT-mode control of the switch doors 8 and 9, whereas the amplifying circuit 10d amplifies and latches the output signal from CPU such that the second switch door 8 is maintained in the upper position under the lower position of the third switch door 9. As a result, the mixed air through air duct 1 is discharged through the lower outlet 1d toward the lower portion of the passenger compartment. In addition, the predetermined computer program returns to the conventional control program from one of points 106 to 109 of the switchover control program to control the electric elements of the air conditioner in such a conventional manner.

Figure 4:
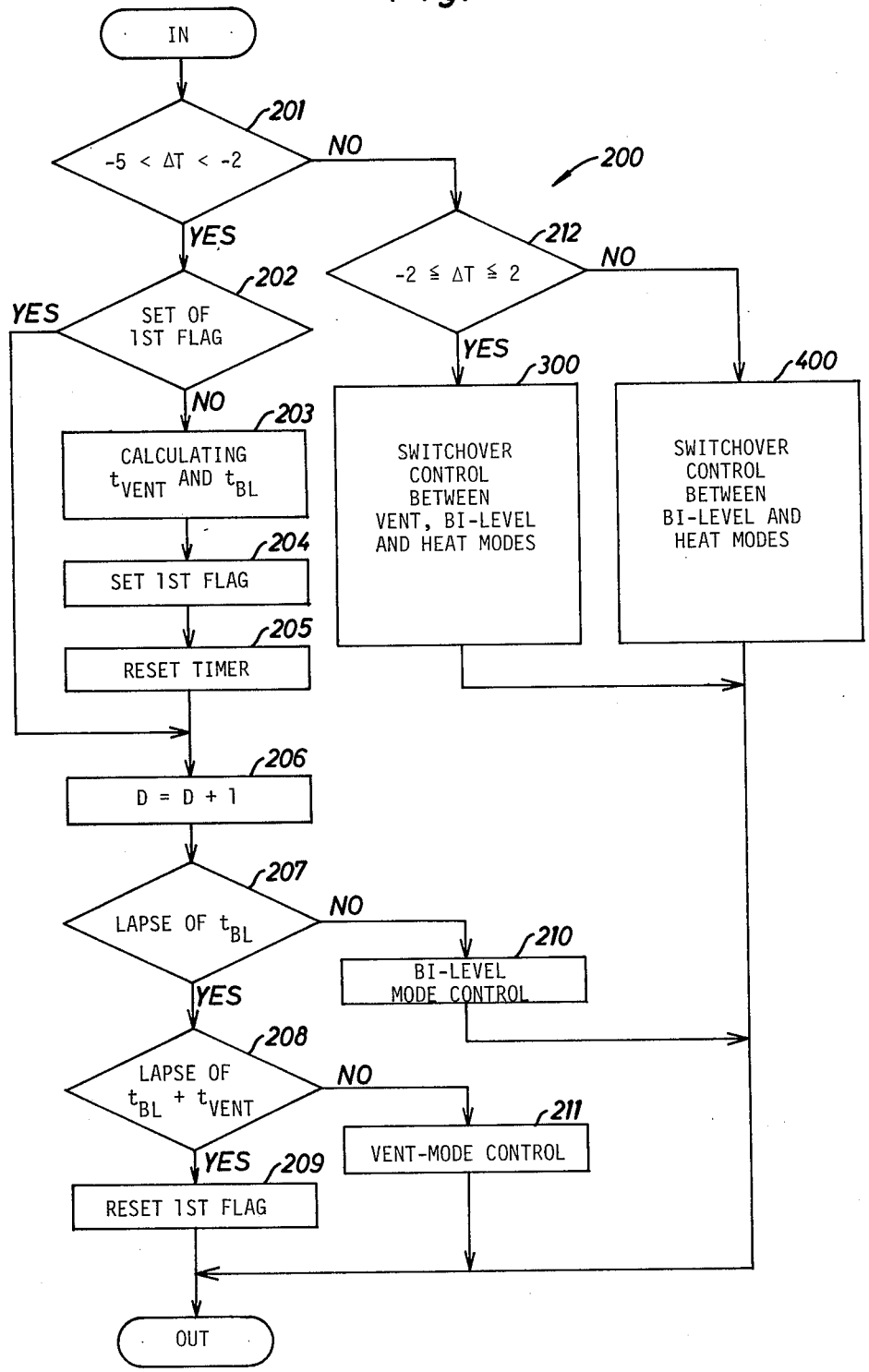
FIGS. 4 to 6 are respectively partial flow diagrams of the whole flow diagram shown in FIG. 3.

When the switchover control program proceeds to the point 110 from the point 102, as previously described, CPU reads out the selected and actual in-car temperatures Ts and Tr from RAM to calculate a deviation $\Delta T$ between the read-out temperatures Ts and Tr. Then, CPU proceeds the switchover control program to a point 111 to discriminate whether or not the calculated deviation $\Delta T$ is smaller than or equal to $-5°$ C. If the calculated deviation $\Delta T$ is smaller than or equal to $-5°$ C., CPU discriminates as "yes" to proceed the switchover control program to the point 108 and conditions the switch doors 8 and 9 in the VENT-mode control, as previously described. At the same time, the VENT-mode control is represented by the display unit 12, as previously described. If the calculated deviation $\Delta T$ is larger than $-5°$ C., CPU discriminates as "no" to proceed the switchover control program to a point 112 so as to discriminate whether or not the calculated deviation $\Delta T$ is larger than or equal to $5°$ C. If the calculated deviation $\Delta T$ is larger than or equal to $5°$ C., CPU discriminates as "yes" to condition the switch doors 8 and 9 in the HEAT-mode control at the point 109 and to represent the same at the display unit 12, as previously described. If the calculated deviation $\Delta T$ is smaller than $5°$ C., CPU discriminates as "no" to proceed the switchover control program to a switchover control routine 200 for the second and third switch doors 8 and 9, as shown in FIGS. 3 and 4.

When the switchover control program proceeds to a point 201 of the control routine 200, CPU discriminates whether or not the calculated deviation $\Delta T$ is larger than $-5°$ C. and smaller than $-2°$ C. If the calculated deviation $\Delta T$ is larger than $-5°$ C. and smaller than $-2°$ C., CPU discriminates as "yes" to proceed the control routine 200 to a point 202 so as to discriminate whether a first flag has been already set or not. Then, CPU discriminates as "no", because any first flag is not set at the initial stage of the control routine 200, as previously described. When the control routine 200 proceeds to a point 203, a pair of time rates are obtained by CPU in relation to the calculated deviation $\Delta T$ on a basis of the switchover mode property from ROM and are multiplied by the predetermined time duration from ROM to provide VENT and BI-LEVEL mode times $t_{VENT}$ and $t_{BL}$.

When the control routine 200 proceeds to a point 204, CPU serves to set a first flag and, in turn, resets the timer of computer 10a at a point 205 to make the preceding timer data D as zero. Then, CPU proceeds the control routine 200 to a point 206 and adds the number of one to the preceding timer data D to provide the following timer data D in such a way to discriminate at a point 207 as to whether or not the calculated BI-LEVEL mode time $t_{BL}$ has lapsed in relation to the following timer data D. If the calculated BI-LEVEL mode time $t_{BL}$ has not yet lapsed, CPU discriminates as "no" to condition the switch doors 8 and 9 in the BI-LEVEL mode control at a point 210 and to represent the same at display unit 12, as previously described. If the calculated BI-LEVEL mode time $t_{BL}$ has lapsed, CPU discriminates as "yes" to discriminate at a point 208 as to whether or not a total of the calculated BI-LEVEL and VENT mode times $t_{BL}$ and $t_{VENT}$ has lapsed in relation to the following timer data D obtained at point 206. If the total mode time $(t_{BL} + t_{VENT})$ has not yet lapsed, CPU serves to condition the switch doors 8 and 9 in the VENT-mode control at a point 211 and to represent the same at display unit 12, as previously described. If the total mode time $(t_{BL} + t_{VENT})$ has lapsed, CPU discriminates as "yes" to reset the first flag at a point 209.

Figure 5:
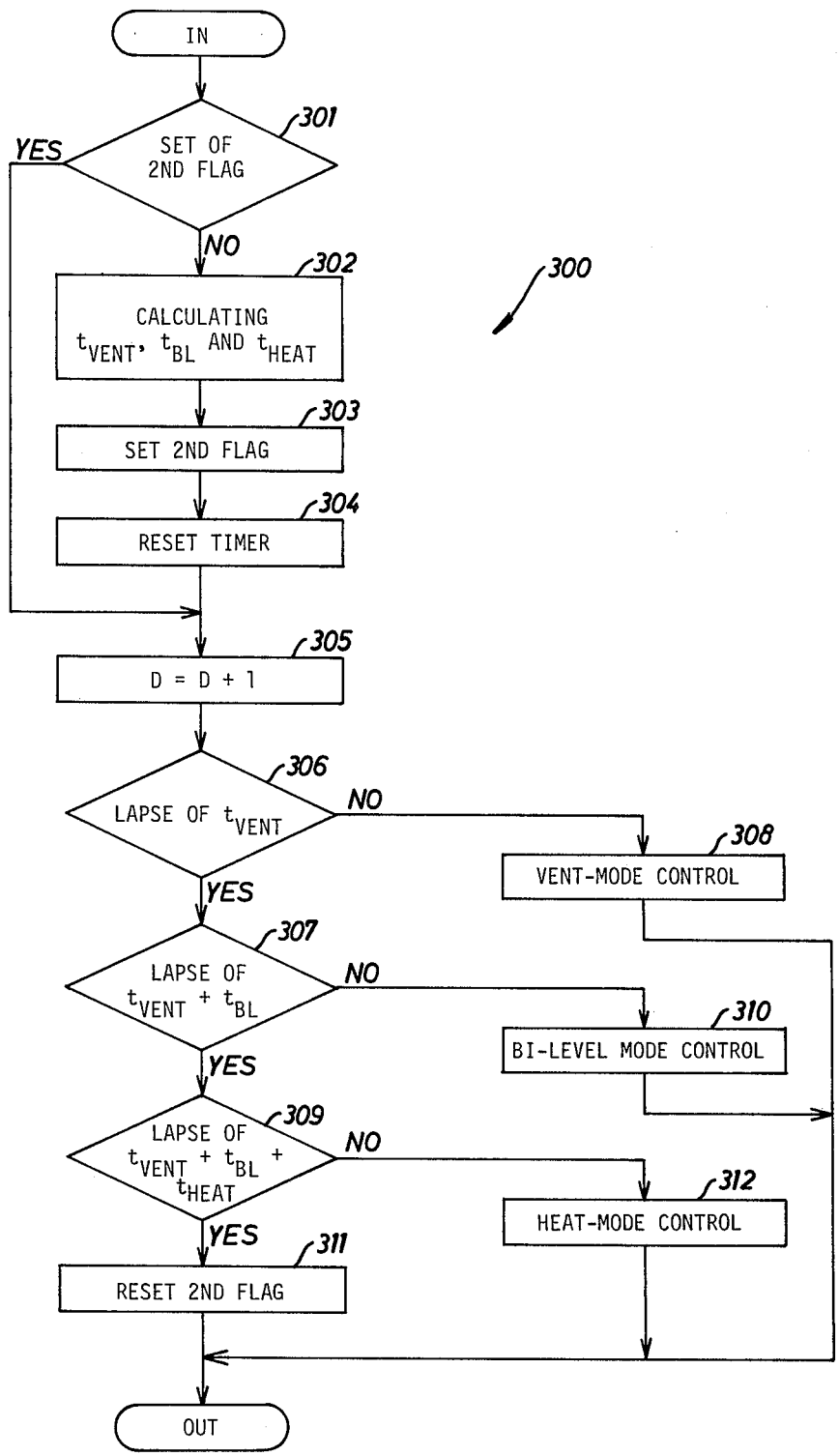

If the calculated deviation $\Delta T$ is not smaller than $-2°$ C., CPU discriminates as "no" at the above-noted point 201 to discriminate at the following point 212 as to whether or not the calculated deviation $\Delta T$ is not smaller than −2° C. and not larger than 2° C. If the calculated deviation ΔT is not smaller than −2° C. and not larger than 2° C., CPU discriminates as "yes" to proceed the control routine 200 to a sub-control routine 300 for switchover control between the VENT, BI-LEVEL and HEAT modes, as shown in FIGS. 4 and 5. When the control routine 200 proceeds to a point 301 of the sub-control routine 300, CPU discriminates whether a second flag has been already set or not. Then, CPU discriminates as "no" due to the same reason as that at the above-noted point 202 of FIG. 4. When the sub-control routine 300 proceeds to a point 302, three time rates are obtained by CPU in relation to the calculated deviation ΔT from the switchover mode property stored in ROM and are then multiplied by the predetermined time duration to provide VENT, BI-LEVEL and HEAT mode times $t_{VENT}$, $t_{BL}$ and $t_{HEAT}$.

Then, a second flag is set at a point 303, and the timer of computer 10a is reset to make a value of the preceding timer data D zero at a point 304. Subsequently, CPU adds the number of one to the preceding timer data D at a point 305 to provide the following timer data D in such a way to discriminate at a point 306 as to whether or not the calculated VENT-mode time $t_{VENT}$ has lapsed in relation to the following timer data D. If the calculated VENT-mode time $t_{VENT}$ has not yet lapsed, CPU discriminates as "no" to condition the switch doors 8 and 9 in the VENT-mode control at a point 308 and to represent the same at display unit 12, as previously described. If the calculated VENT-mode time $t_{VENT}$ has lapsed, CPU discriminates as "yes" to discriminate at a point 307 as to whether or not a total of the calculated VENT and BI-LEVEL mode times $t_{VENT}$ and $t_{BL}$ has lapsed in relation to the following timer data D. If the total mode time ($t_{VENT}+t_{BL}$) has not yet lapsed, CPU serves to condition the switch doors 8 and 9 in the BI-LEVEL mode control at a point 310 and to represent the same at display unit 12, as previously described. If the total mode time ($t_{VENT}+t_{BL}$) has lapsed, CPU serves to discriminate at a point 309 as to whether or not a total of the calculated VENT, BI-LEVEL and HEAT mode times $t_{VENT}$, $t_{BL}$ and $t_{HEAT}$ has lapsed in relation to the following timer data D. If the total mode time ($t_{VENT}+t_{BL}+t_{HEAT}$) has not yet lapsed, CPU serves to condition the switch doors 8 and 9 in the HEAT-mode control at a point 312 and to represent the same at display unit 12, as previously described. If the total mode time ($t_{VENT}+t_{BL}+t_{HEAT}$) has lapsed, CPU serves to reset the second flag at a point 311.

Figure 6:
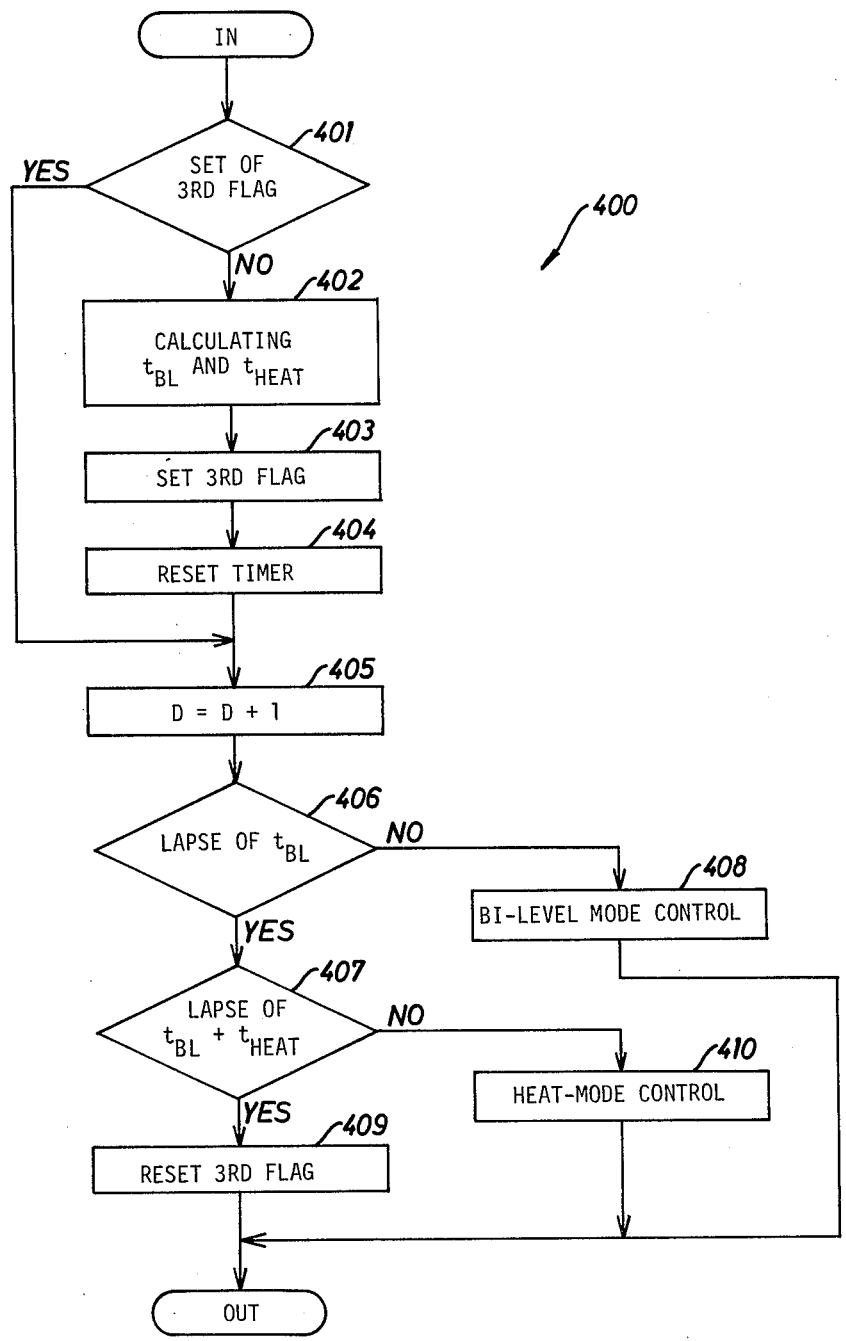

If the calculated deviation ΔT is larger than 2° C., CPU discriminates as "no" to proceed the control routine 200 to a sub-control routine 400 for switchover control between the BI-LEVEL and HEAT modes, as shown in FIGS. 3 and 6. When the control routine 200 proceeds to a point 401 of the sub-control routine 400, CPU discriminates as "no" due to the same reason as that at the above-noted point 202 of FIG. 4. When the subroutine 400 proceeds to a point 402, a pair of time rates are obtained by CPU in relation to the calculated deviation ΔT from the switchover mode property stored in ROM and are then multiplied by the predetermined time duration to provide BI-LEVEL and HEAT mode times $t_{BL}$ and $t_{HEAT}$.

Then, a third flag is set at a point 403, and the timer of computer 10a is reset to make a value of the preceding timer data D zero at a point 404. Subsequently, CPU adds the number of one to the preceding timer data D at a point 405 to provide the following timer data D in such a way to discriminate at a point 406 as to whether or not the calculated BI-LEVEL mode time $t_{BL}$ has lapsed in relation to the following timer data D. If the calculated BI-LEVEL mode time $t_{BL}$ has not yet lapsed, CPU discriminates as "no" to condition the switch doors 8 and 9 in the BI-LEVEL mode control at a point 408 and to represent the same at display unit 12, as previously described. If the calculated BI-LEVEL mode time $t_{BL}$ has lapsed, CPU discriminates as "yes" to discriminate at a point 407 as to whether or not a total of the calculated BI-LEVEL and HEAT mode times $t_{BL}$ and $t_{HEAT}$ has lapsed in relation to the following timer data D. If the total mode time ($t_{BL}+t_{HEAT}$) has not yet lapsed, CPU serves to condition the switch doors 8 and 9 in the HEAT-mode control at a point 410 and to represent the same at display unit 12, as previously described. If the total mode time ($t_{BL}+t_{HEAT}$) has lapsed, CPU serves to reset the third flag at a point 409.

Hereinafter, the whole operational modes of the above embodiment will be described. Assuming that the switch doors 8 and 9 are located respectively at their original positions under deactivation of switches 11b, 11c, 11d and 11e upon the above-mentioned initialization of microcomputer 10a, the switchover control program proceeds from the point 101 to the point 106 through the points 103, 104 and 105 to condition the switch doors 8 and 9 in the BI-LEVEL mode control, as previously described (see FIG. 3). At the same time, the display unit 12 serves to indicate the BI-LEVEL mode control of the switch doors 8 and 9, as previously described. Thereafter, the above-noted execution is repeated at a time period of hundreds of milliseconds to maintain the BI-LEVEL mode control.

When the automatic control switch 11b is closed during the above repetitive execution, CPU discriminates as "yes" at point 102 of FIG. 3 to calculate at point 110 a deviation ΔT between the desired and actual in-car temperatures Ts and Tr, as previously described. If the calculated deviation ΔT is larger than −5° C. and smaller than −2° C., the switchover control program proceeds from point 110 to point 203 of FIG. 4 through points 111, 112, 201 and 202 to calculate VENT and HEAT mode times $t_{VENT}$ and $t_{BL}$, as previously described. Then, CPU serves to set a first flag at point 204 and to proceed the control routine 200 to point 210 through point 207 to condition the switch doors 8 and 9 in the BI-LEVEL mode control and to indicate the same at the display unit 12, as previously described.

When the switchover control program proceeds to point 202 again through point 201, CPU discriminates as "yes" because the first flag has been already set at point 204. This means that CPU proceeds the switchover control program directly to point 206. Then, CPU proceeds the switchover control program to point 210 through point 207 to maintain the BI-LEVEL mode control of switch doors 8 and 9 and the indication of the same at display unit 12. Thereafter, the above execution is repeated to maintain the BI-LEVEL mode control of the switch doors 8 and 9 and the representation of the same at display unit 12.

When CPU discriminates as "yes" at point 207 due to lapse of the calculated BI-LEVEL mode time $t_{BL}$ relative to the following timer data D repetitively obtained at point 206, it proceeds the control routine 200 to point 211 through point 208 to condition the switch doors 8 and 9 in the VENT-mode control and to indicate the same at display unit 12, as previously described. Thereafter, the execution from point 208 to point 211 in the control routine 200 is repeated to maintain the VENT-mode control of the switch doors 8 and 9 and the indication of the same at display unit 12. When CPU discriminates as "yes" at point 208 due to lapse of a total of the calculated BI-LEVEL and VENT mode times $t_{BL}$ and $t_{VENT}$ relative to the following timer data D, it proceeds the control routine 200 to point 209 to reset the first flag. This means to complete switchover control of the switch doors 8 and 9 from the BI-LEVEL mode to the VENT-mode.

From the above description, it should be understood that if the calculated deviation $\Delta T$ is larger than $-5°$ C. and smaller than $-2°$ C., both the proceedings respectively through the points 210 and 211 of control routine 200 are repetitively alternated with each other in relation to the BI-LEVEL and VENT mode times $t_{BL}$ and $t_{VENT}$ to selectively conduct the BI-LEVEL and VENT mode control. Furthermore, it will be easily understood that if the calculated deviation $\Delta T$ is not smaller than $-2°$ C. and not larger than $2°$ C., all the proceedings respectively through the points 308, 310 and 312 are repetitively alternated with each other in relation to the VENT, BI-LEVEL and HEAT mode times $t_{VENT}$, $t_{BL}$ and $t_{HEAT}$ to selectively conduct the VENT, BI-LEVEL and HEAT mode control. It will be also easily understood that if the calculated deviation $\Delta T$ is larger than $2°$ C. and smaller than $50°$ C., both the proceedings respectively through the points 408 and 410 are repetitively alternated with each other in relation to the BI-LEVEL and HEAT mode times $t_{BL}$ and $t_{VENT}$ to selectively conduct the BI-LEVEL and HEAT mode control.

As a result of the above descriptions, it should be understood that the air within the passenger compartment is moved under the repetitive switchover control of switch doors 8 and 9 to give comfortable feeling to the operator in the compartment. In this case, the comfortable feeling given to the operator is facilitated, because the above-noted repetitive switchover control is conducted in dependence upon variation of the mode times $t_{BL}$, $t_{VENT}$ and $t_{HEAT}$ caused by change of the actual in-car temperature (see FIG. 7).

When one of the DEF, VENT and HEAT mode switches 11c, 11d and 11e is closed during the above-noted whole operational modes, discrimination at one of points 103, 104 and 105 of FIG. 3 is repetitively conducted as "yes" to condition the switch doors 8 and 9 in the DEF, VENT or HEAT mode control, as previously described.

Although in the above embodiment the predetermined time duration stored in ROM is a constant, it may be modified to be manually varied by the operator in necessity.

While in the above embodiment the control routine 200 is arranged to conduct switchover control between the VENT, BI-LEVEL and HEAT modes in dependence upon change of the deviation $\Delta T$, it may be also modified to conduct switchover control between the VENT, BI-LEVEL, HEAT and DEF modes in dependence upon change of the deviation $\Delta T$.

Having thus described the preferred embodiment of the invention it should be understood that numerous structural modifications and adaptations may be resorted to without departing from the spirit of the invention.

What is claimed is:

1. A method of automatically controlling an air conditioner which supplies an air flow into a compartment or other region, the air conditioner comprising air flow temperature control means for adjusting the actual temperature in said compartment or other region to a desired value and maintaining it at said desired value; and air flow direction control means arranged to be adjusted to a first position in which the air flow is directed to a second portion in said compartment or other region; the method comprising the steps of:
    (a) detecting a deviation between the actual temperature in said compartment or other region and said desired value;
    (b) calculating first and second periods of time respectively for maintaining the air flow direction toward the first and second portions in said compartment or other region in relation to said detection deviation;
    (c) producing a first output signal indicative of the calculated first period of time and successively producing a second output signal indicative of the calculated second period of time upon lapse of the calculated first period of time;
    (d) adjusting said air flow direction control means to its first position in response to said first output signal and maintaining it at the adjusted position during the calculated first period of time; and
    (e) adjusting said air flow direction control means to its second position in response to said second output signal and maintaining it at the adjusted position during the calculated second period of time; said first and second output signals being repetitively produced to adjust said air flow direction control means from its first position to its second position.

2. A method of automatically controlling an air conditioner as claimed in claim 1, wherein the step of calculating first and second periods of time is conducted when said detected deviation is in a predetermined temperature range.

3. A method of automatically controlling an air conditioner as claimed in claim 2, wherein said air flow direction control means is further arranged to be adjusted to a third position in which the air flow is directed to a third portion in said compartment or other region; and wherein the method further comprises the steps of:
    calculating third, fourth and fifth periods of time respectively for maintaining the air flow direction toward the first, second and third portions in said compartment or other region in relation to said detected deviation in a second predetermined temperature range narrower than said first-named predetermined temperature range;
    producing a third output signal indicative of the calculated third period of time, a fourth output signal indicative of the calculated fourth period of time upon lapse of the calculated third period of time, and a fifth output signal indicative of the calculated fifth period of time upon lapse of the calculated third and fourth periods of time; and
    adjusting said air flow direction control means to its first, second and third positions respectively in response to said third, fourth and fifth output signals and maintaining it at the adjusted position during each of the calculated third, fourth and fifth periods of time.

4. A control apparatus for use with an air conditioner which is arranged to supply an air flow into a compartment or other region, the air conditioner comprising air flow temperature control means for adjusting the actual temperature in said compartment or other region to a desired value and maintaining it at said desired value; and air flow direction control means arranged to be adjusted to a first position in which the air flow is directed to a first portion in said compartment or other region and to a second position in which the air flow is directed to a second portion in said compartment or other region; the control apparatus comprising:

first means for generating a first signal indicative of said desired value in said compartment or other region;

second means for generating a second signal indicative of the actual temperature in said compartment or other region;

third means for detecting a deviation between values of the first and second signals and for calculating first and second periods of time respectively for maintaining the air flow direction toward the first and second portions in said compartment or other region in relation to the detected deviation, said third means being arranged to produce a first output signal indicative of the calculated first period of time and to produce a second output signal indicative of the calculated second period of time upon lapse of the calculated first period of time; and actuator means responsive to said first output signal from said third means for adjusting said air flow direction control means to its first position and maintaining it at the adjusted position during the calculated first period of time and responsive to said second output signal from said third means for adjusting said air flow direction control means to its second position and maintaining it at the adjusted position during the calculated second period of time.

5. A control apparatus as claimed in claim 4, wherein said third means is in the form of a digital computer programmed to detect a deviation between values of the first and second signals and to calculate first and second periods of time respectively for maintaining the air flow direction toward the first and second portions in said compartment or other region in relation to the detected deviation, said digital computer being arranged to produce a first output signal indicative of the calculated first period of time and to produce a second output signal indicative of the calculated second period of time upon lapse of the calculated first period of time; and wherein said actuator means is responsive to the first output signal for adjusting said air flow direction control means to its first position and maintaining it at the adjusted position during the calculated first period of time and responsive to the second output signal for adjusting said air flow direction control means to its second position and maintaining it at the adjusted position during the calculated second period of time.

6. A control apparatus as claimed in claim 5, wherein said digital computer is programmed to determine the rate of the first period of time to the second period of time in consideration with performance of said air conditioner.

7. A control apparatus for use with an automobile air conditioner which is arranged to supply an air flow into a vehicle compartment, the automobile air conditioner comprising air flow temperature control means for adjusting the actual in-car temperature in said compartment to a desired value and maintaining it at said desired value; and air flow direction control means arranged to be adjusted to a ventilation-mode control position in which the air flow is directed to a middle portion in said compartment and to a bi-level mode control position in which the air flow is directed to both the middle and lower portions in said compartment; the control apparatus comprising:

a temperature selector for generating a first electric signal indicative of a desired temperature in said compartment;

an in-car temperature sensor arranged within said compartment for generating a second electric signal indicative of the actual in-car temperature in said compartment;

computer means programmed to detect a deviation between values of the first and second electric signals and to calculate first, second and third periods of time for maintaining the air flow direction respectively toward the middle portion, both the middle and lower portions, and the lower portion in said compartment in relation to the detected deviation, said computer means being arranged to produce a first output signal indicative of the calculated first period of time, to produce a second output signal indicative of the calculated second period of time upon lapse of the calculated first period of time, and to produce a third output signal indicative of the calculated third period of time upon lapse of the calculated first and second periods of times; and actuator means responsive to the first output signal from said computer means for adjusting said air flow direction control means to its ventilation-mode control position and maintaining it at the adjusted position during the calculated first period of time, responsive to the second output signal from said computer means for adjusting said air flow direction control means to its bi-level mode control position and maintaining it at the adjusted position during the calculated second period of time, and responsive to the third output signal from said computer means for adjusting said air flow direction control means to its heat-mode control position and maintaining it at the adjusted position during the calculated third period of time.

8. A control apparatus as claimed in claim 7, wherein said computer means is programmed to calculate the first, second and third periods of time at a constant rate when said detected deviation is in a predetermined temperature range, to increase the rate of the third period of time to the first and second periods of time when said detected deviation is a positive value out of said predetermined temperature range, and to increase the rate of the first period of time to the second and third periods of time when said detected deviation is a negative value out of said predetermined temperature range.

* * * * *